Feb. 14, 1950 K. H. ANDREN 2,497,112
WIRE CUTTING AND STRIPPING APPARATUS
Filed May 14, 1945 3 Sheets-Sheet 2
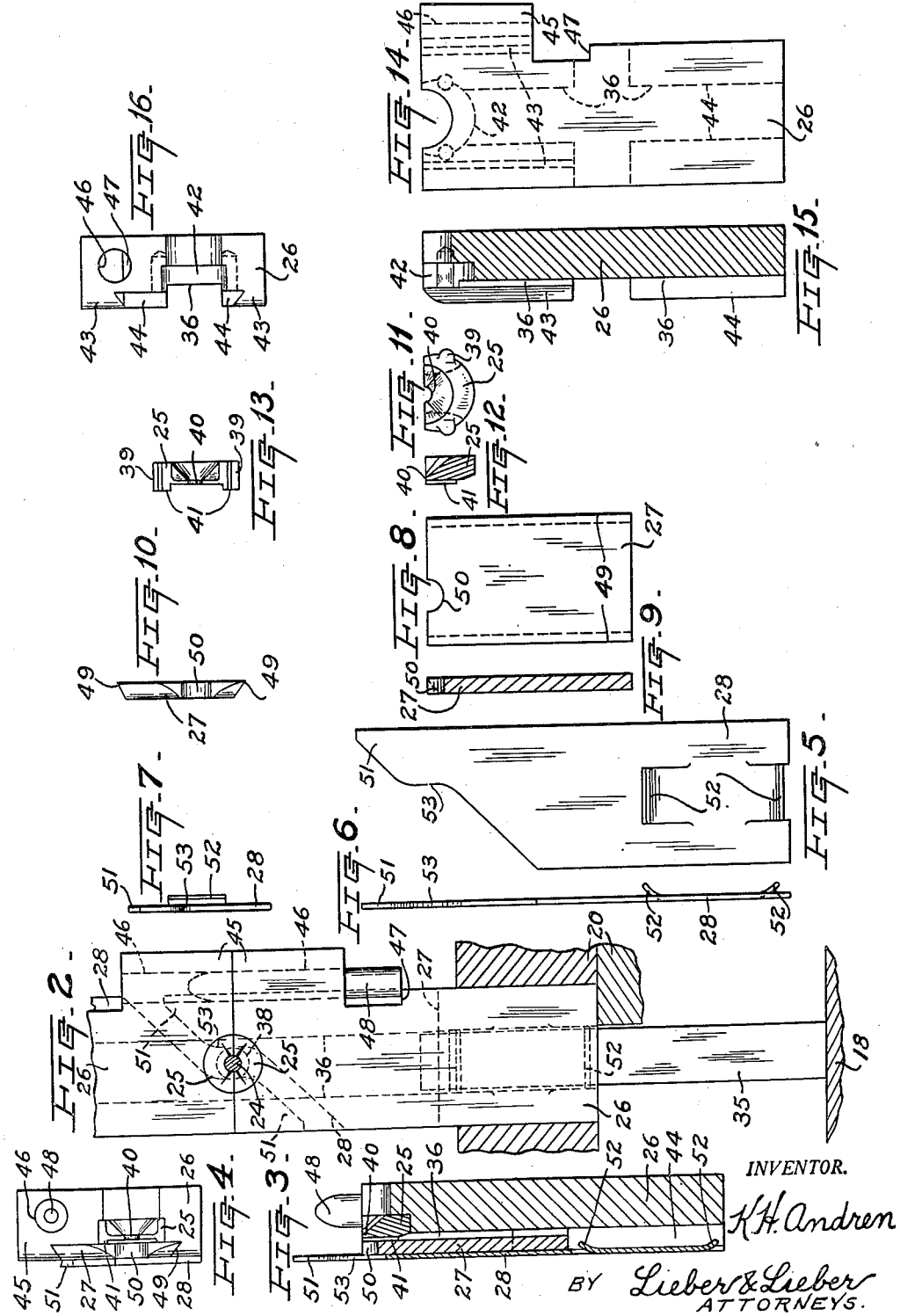
INVENTOR.
K. H. Andren
BY Lieber & Lieber
ATTORNEYS.

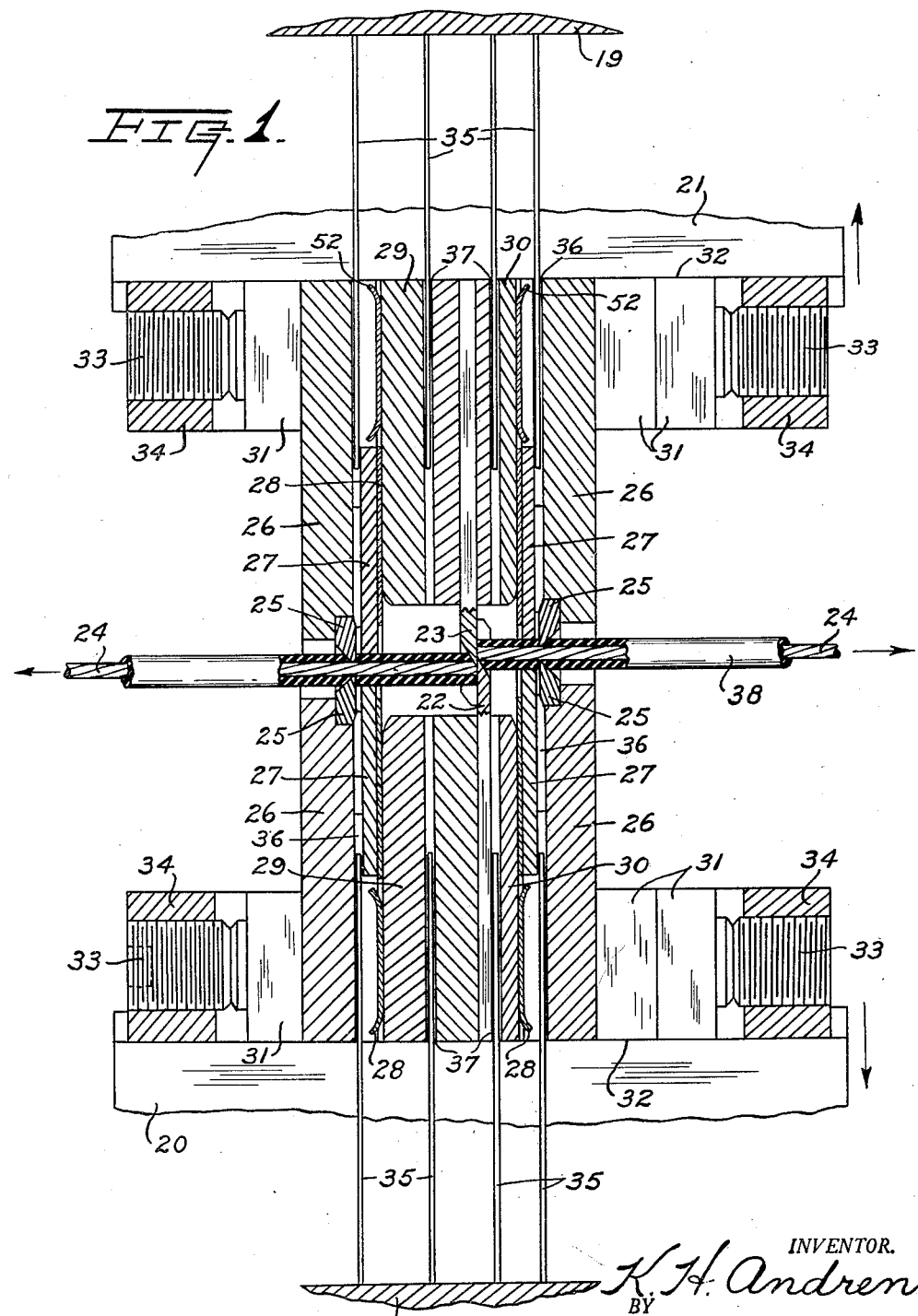

Feb. 14, 1950     K. H. ANDREN     2,497,112
WIRE CUTTING AND STRIPPING APPARATUS
Filed May 14, 1945     3 Sheets-Sheet 3
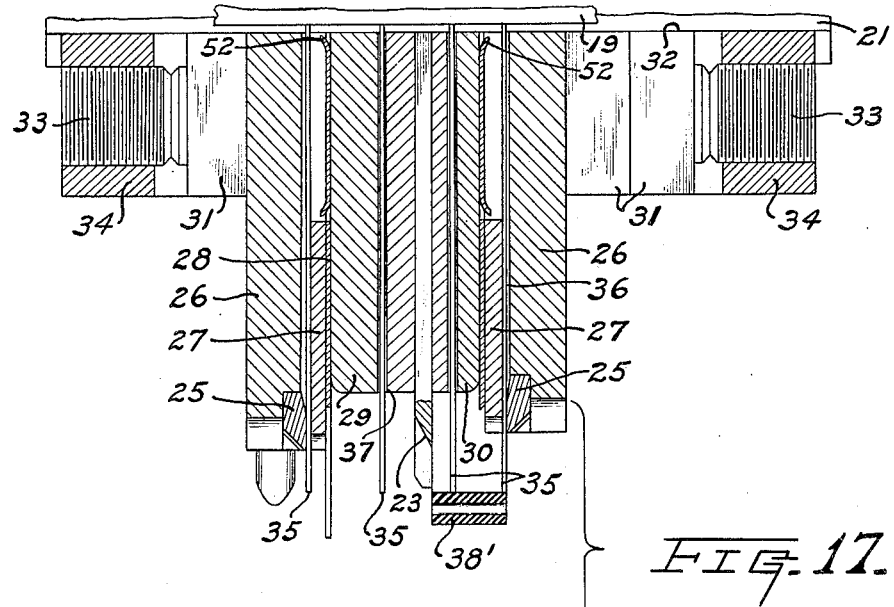
FIG. 17.
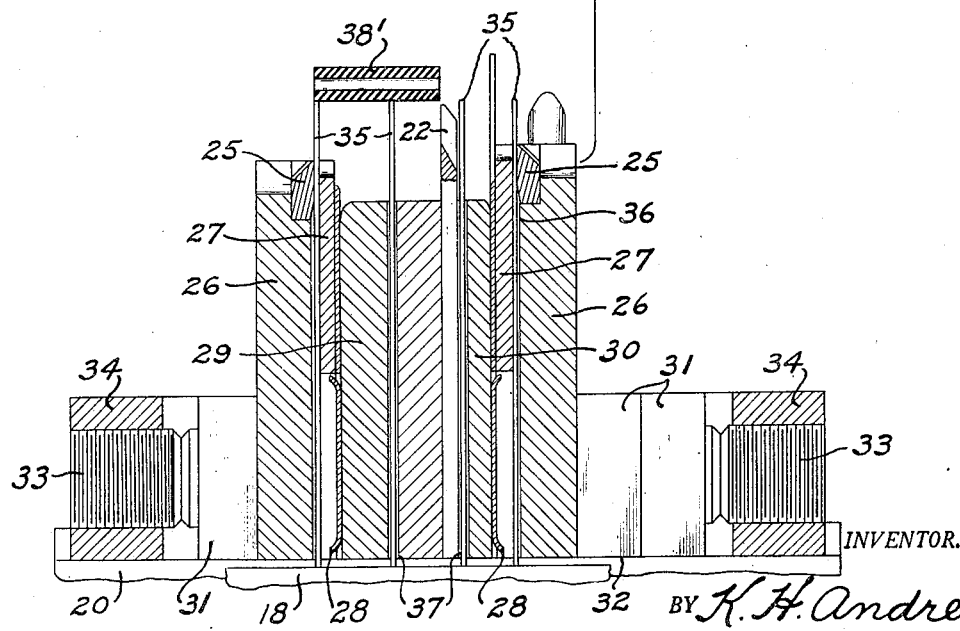
INVENTOR.
BY K. H. Andren
Lieber & Lieber
ATTORNEYS.

Patented Feb. 14, 1950

2,497,112

UNITED STATES PATENT OFFICE 2,497,112

WIRE CUTTING AND STRIPPING APPARATUS

Karl H. Andren, Greenfield, Wis., assignor to Artos Engineering Company, Milwaukee, Wis., a corporation of Wisconsin Application May 14, 1945, Serial No. 593,745

5 Claims. (Cl. 81—9.51)

This invention relates generally to improvements in the art of severing and otherwise treating elongated elements, and relates more specifically to improvements in the construction and operation of cutting and stripping apparatus for insulation covered wire or the like.

The primary object of my present invention is to provide various improvements in the construction and operation of cutting and stripping machines, whereby such structures are simplified, the cost of operation is minimized, and the efficiency is enhanced.

It has long been customary to utilize so-called cutting and stripping machines for the purpose of automatically severing insulated solid and/or stranded wires into successive predetermined lengths, and for stripping some insulation from the wire sections adjacent to the opposite ends thereof. Perhaps the most successful and practical of these cutting and stripping mechanisms, comprises a pair of cooperating reciprocable knife blades for severing successive pieces from a wire, clamps cooperable with the wire on opposite sides of the severing knives for feeding the wire lengthwise past the zone of cutting and for also effecting longitudinal stripping motion of the severed wire ends, cutting and stripping blades for the insulation coacting with the wire coverings on opposite sides of the zone of severance, and mechanism for automatically actuating the knives, stripping blades, and clamps in timed relation to each other.

In these prior machines, the guides which are necessary in order to rapidly and accurately position the wire with respect to the severing and stripping blades, and the stripping blades themselves, were customarily formed integral with each other, and since the stripper blades had to be constructed of relatively durable and costly wear-resistant material, this procedure was rather expensive because the combined stripping and guide assemblages must frequently be renewed in spite of their wear-resistant qualities. Then too, this prior method of forming the guides and stripper blades integral with each other, required the provision of a large number of different styles and sizes of guiding and stripping sets each comprising two cooperating cutting and guiding units, in order to permit cutting and stripping of wires having different diameters and different thicknesses of insulation, thus making the prior mode of constructing the guiding and stripping members extremely cumbersome and costly both from the renewal standpoint and in order to handle diverse types of wire.

In the previous machines of this type, it was also necessary because of the formation of the guides and stripping blades integral with each other, to provide rather complicated and ineffective knockout elements for insuring release of the wire and insulation from the wire severing and insulation cutting blades, and these knockout elements could not be disposed where their action would be most effective. The prior machines, moreover, failed to make proper provision for clamping the insulation adjacent to the zone of action of the stripper blades, so as to insure clean cutting of the insulation alone without marring or severing strands of the embedded wires, thus additionally making the previous cutting and stripping assemblages relatively objectionable.

It is therefore a more specific object of this invention to provide an improved wire guiding and severing and stripping blade assembly for automatic insulated wire cutting and stripping machines, which obviates all of the above-mentioned objectionable features, and which insures maximum life of the equipment while also functioning most effectively.

Another specific object of the invention is to provide a simplified, durable, and more efficient wire guiding and stripper blade assemblage for automatic cutting and stripping mechanisms, which will facilitate renewal of the stripping blades at minimum cost, and which also avoids necessity of carrying in stock a large variety of parts for operating upon different types of wire.

A further specific object of my invention is to provide improved knockout mechanism for quickly and most effectively removing the wire and insulation from the cutting and stripping members of a wire cutting and stripping machine or the like, which functions automatically after each cutting and stripping operation has been performed.

Still another specific object of the present invention is to provide simple and effective means for clamping the wire insulation closely adjacent to the zone of action of the insulation severing and stripping blades, so as to insure clean cutting of the insulation and efficient removal of the severed wire coverings without damaging the wire.

An additional specific object of my present invention is to provide various improvements in the construction and operation of insulated wire cutting and stripping machines, whereby the cost of construction and operation is reduced to a minimum, while the flexibility and efficiency are enhanced to the maximum extent.

These and other specific objects and advantages of the invention will be apparent from the following detailed description.

A clear conception of the features constituting my present improvements, and of the mode of constructing and of operating machines embodying the invention, may be had by referring to the drawings accompanying and forming a part of this specification wherein like reference characters designate the same or similar parts in the various views.

Fig. 1 is a central horizontal section through a typical insulated wire cutting and stripping apparatus showing the severing and stripping blades in action on a stranded insulation covered wire, and also showing fragments of the blade carrying and actuating front and rear slides, and of the stationary knockout plate supports;

Fig. 2 is a fragmentary side elevation of one of the stripping blade and knockout plate units, showing the adjacent wire guides, and also showing fragments of a front slide and stationary support;

Fig. 3 is a central horizontal section through one of the stripper blades, its carrier element, the adjacent insulation clamping and blade locking plate, and an adjacent wire guide;

Fig. 4 is an end view of the assemblage of Fig. 3, looking toward the stripper blade thereof;

Fig. 5 is a side elevation of one of the interchangeable guides for properly positioning the wire relative to the cutting and stripping blades;

Fig. 6 is an edge view of the wire guide shown in Fig. 5;

Fig. 7 is an end view of the same wire guide;

Fig. 8 is a side elevation of one of the interchangeable insulation clamping and stripper blade locking plates;

Fig. 9 is a longitudinal section through the plate of Fig. 8, taken centrally through the clamping socket thereof;

Fig. 10 is an end view of the same clamping and locking plate, looking toward its insulation clamping socket;

Fig. 11 is a side elevation of one of the improved insulation severing and stripping inserts or blades;

Fig. 12 is a central section through the cutting and stripping insert of Fig. 11;

Fig. 13 is an end view of the same insert blade, looking toward the wire engaging edge thereof;

Fig. 14 is a side elevation of one of the stripper blade carrier elements, with the blade and alining pin removed therefrom;

Fig. 15 is a central longitudinal section through the blade carrier element of Fig. 14;

Fig. 16 is an end view of the same blade carrier element, looking toward the blade receiving socket thereof; and Fig. 17 is a view similar to Fig. 1, but showing the blade carrying slides separated and the knockout plates in the act of removing the stripped insulation from the wire and insulation cutting blades and from the insulation clamping plates.

While the invention has been shown and described as being especially advantageously applicable to an insulated wire cutting and stripping machine having horizontally movable front and rear slides upon which the cutting and stripping blades are mounted and which are cooperable with fixedly mounted knockout plates, it is not my desire or intent to thereby unnecessarily restrict the utility of the improved features for other purposes.

Referring to Figs. 1, 2 and 17 of the drawing, the improved insulated wire cutting and stripping apparatus shown therein comprises in general, a pair of horizontally spaced front and rear stationary supports 18, 19 respectively; a pair of front and rear periodically reciprocable slides 20, 21 respectively, movable toward and away from the central vertical plane of the space separating the supports 18, 19; a pair of front and rear wire severing knife blades 22, 23 firmly but adjustably secured to the slides 20, 21 respectively, and being cooperable to sever an insulated wire 24 into successive sections; a pair of cooperating interchangeably similar insulation cutting and stripping blades 25 carried by similar carrier elements 26 firmly mounted upon the slides 20, 21 for adjustment toward and away from the plane of cutting of the knives 22, 23, on each of the opposite sides of said plane; an insulation clamping and stripper blade locking plate 27 detachably secured to each carrier element 26; a wire guide 28 coacting with each of the clamping plates 27; composite spacers 29, 30 of selected thickness clampingly engaging the knife blades 22, 23 and the adjacent wire guides 28; positioning and clamping blocks 31 disposed in grooves or pockets 32 of tool holders 34 carried by the slides 20, 21 within which the ends of the blades 22, 23, elements 26, guides 28, and spacers 29, 30 are also confined, and coacting with the adjacent carrier elements 26; clamping screws 33 having screw thread coaction with the tool holders 34 which are rigidly attached to the slides 20, 21, and coacting with the blocks 31 to firmly secure the blade and guide structures thereto; and a series of parallel rectilinear knockout plates 35 secured to the stationary supports 18, 19 and having their free ends slidably cooperable with recesses 36, 37 formed in the elements 26 and spacers 29, 30 respectively.

The front supports 18, 19 and slides 20, 21 are of well known construction, and the same is true of the mechanisms for longitudinally advancing the wire 24 and for periodically reciprocating the blade and guide carrying slides 20, 21 between the supports 18, 19. It may be stated, however, that the reciprocating motion of the slides 20, 21 is ordinarily in a horizontal direction and approximately rectilinear, and the wire 24 may be either solid or stranded of different diameters and covered with insulation 38 of different thicknesses. The reciprocating front and rear knife blades 22, 23 are also of well known construction, being formed of durable metal and cooperable to cut entirely through the wire 24 and the insulation 38, as clearly indicated in Figure 1, and these severing knives are of interchangeably similar construction and must be operable by the slides 20, 21 so as to accurately and positively sever the wire into the desired lengths. The present invention therefore involves specific improvements in structure other than the fixed supports 18, 19, slide actuating and wire feeding mechanism, and knife blades 22, 23.

Referring specifically to Figs. 1, 2, 3, 4 and 8 to 16 inclusive, the improved insulation cutting and stripping blades 25 when adapted for cooperation with insulated wire 24 of definite diameter, are all of interchangeably similar construction, and these insert blades 25 are preferably formed of some hard and wear-resistant material such as sintered carbide. As shown in Figs. 11, 12 and 13, each of these blades 25 comprises a relatively small approximately semi-circular insert having oppositely extending ears or lugs 39 projecting outwardly therefrom, and also being provided with a semi-circular cutting edge 40 of approximately the same diameter as that of the wire 24 which is to be stripped. Each blade 25 also has two parallel ribs 41 projecting away from one side thereof; and is snugly cooperable along its opposite side and periphery, with a socket 42 formed in its carrier element 26.

The carrier elements 26 are also of similar construction but may be formed of any suitable ordinary material since they do not coact directly with the wire 24 and need not therefore be replaced as in the case of the blades 25, when wires of different diameters are being cut and stripped. As shown in Figs. 14, 15 and 16, each carrier element 26 besides having a blade confining socket 42 formed therein, is provided on opposite sides of and near its socket with parallel undercut lateral projections 43, and also has a pair of parallel spacer lugs 44 remote from the socket 42 disposed in alinement with the dovetailed groove formed by the undercut projections 43, the projections 43, 44 being spaced apart to produce the recesses 36 in the elements 26. Each of the blade supporting elements 26 is additionally provided with a side exetension 45 having a hole 46 therein, and at least one element of each set has an abutment 47 disposed in alinement with the hole 46 therein; and an elongated alining pin 48 is adapted to slidably coact with the hole 46 of one of each cooperating set of elements 26 and coacts with the abutment 47 of the complementary elements as illustrated in Figs. 2, 3 and 4, in order to insure proper cooperation of the stripper blades 25 carried by the elements 26.

The sockets 42 of the blade carrying elements 26 are of the same shape as the insert blades 25, and the latter are insertable laterally into these sockets 42 through the open sides thereof. After insertion of a blade 25 within a socket 42, it is positively confined and locked in place by one of the insulation clamping and insert locking plates 27 shown in detail in Figs. 8, 9 and 10. These plates 27 are likewise of interchangeably similar construction and must be replaced when wire 24 having insulation 38 of greater or lesser diameter is being operated upon. Each plate 27 is of rectangular shape and has inclined opposite edges 49 providing a dovetailed cross-section corresponding to that of the groove between the undercut projections 43 of the carrier element 26; and each plate 27 is also provided with a semi-circular insulation clamping socket 50. When the plate 27 is driven into the dovetailed recess of the corresponding element 26 as in Figs. 3, 4 and 5, it engages the ribs 41 of the adjacent insert blade 25 and thus locks the carbide blade in place; and the end of the clamping plate 27 remote from the socket 50 engages and is stopped by the inner ends of the parallel lugs 44. The plates 27 thus perform the triple function of locking the blades 26 within the sockets 42, of clamping the wire insulation 38 directly adjacent to the blades 26, and of forming the guiding recesses 36 for the knock out plates 35.

The improved wire guides 28 for automatically properly positioning the successive sections of the wire 24 with respect to the cutting and stripping blades 22, 23, 25, and which coact with the clamping and locking plates 27, are again made of interchangeably similar construction as shown in detail in Figs. 5, 6 and 7. Each of these guides 28 is formed of sheet metal, and is provided at one end with a tapered guiding projection 51 and at its opposite end with a pair of spaced laterally projecting ears 52. The tapered projection 51 of each guide 28 is provided with a wire centralizing side surface 53 adapted to engage the wire insulation 38 as illustrated in Fig. 2, and the ears 52 are adapted to fit into the adjacent recess 36 between the parallel lugs 44 of the adjoining element 26. The composite spacers 29, 30 are of rectangular prismatic shape, and may be of any desired width or thickness depending upon the length of insulation 38 which it is desired to strip from each end of each cut section of the wire 24, and one face of each of these spacers snugly coacts with the adjacent cutting blade 22, 23 while the opposite face thereof clampingly engages the adjacent guide 28, see Fig. 1. As previously indicated, the outer ends of the wire cutting knives 22, 23, of the stripper blade carrier elements 26, of the wire guides 28, and of the composite spacers 29, 30, are all snugly fitted within the pockets or grooves 32 of the tool holders 34; and are firmly clamped within these grooves 32 by the clamping screws 33 coacting with holders 34 and with the clamping and positioning blocks 31. The fixed knock out plates 35 which are slidably cooperable with the elongated recesses 36, 37 of the reciprocating assemblages, are merely stiff elongated rectangular plates formed of sheet metal or the like, as indicated in Fig. 2, and these plates 35 extend across the plane of the longitudinal axis of the wire 24.

During normal use of the improved wire cutting and stripping apparatus, the parts must first be properly selected and assembled so as to insure performance of the work which is contemplated. As shown in the drawings, spacers 29, 30 have been selected to effect stripping of about twice the length of insulation from the end of the wire 24 to the left of the cutting blades 22, 23, as compared to that removed from the complementary severed end of the same wire, and the fixed knockout plates 35 may be caused to properly cooperate with the guide recesses 36, 37 by utilizing shims and spacing blocks 31 of proper thickness. Insulation cutting and stripping blades 25 and clamping plates 27 adapted to properly cooperate with the wire which is to be severed and stripped, should be applied to the carrier elements 26, after which the wire severing blades 22, 23, spacers 29, 30, wire guides 28, and blade carrying elements 26 may be inserted in the grooves 32 of the front and rear slides 20, 21 and firmly clamped in position by manipulation of the screws 33.

During subsequent normal operation of the improved assemblage, the front and rear slides 20, 21 will be intermittently reciprocated so as to move them toward and away from the zone of action of the severing and striping blades 22, 23, 25. When the slides 20, 21 are moved toward the wire 24 after the wire has been brought to rest, the guides 28 coact with the wire insulation 38 as shown in Fig. 2, to properly position the wire 24 relative to the knives, and the plates 27 clamp the insulation adjacent to the blades 25. The severing blades 22, 23 thereafter sever the wire and the insulation thereon as illustrated in Fig. 1, and the stripping blades 25 simultaneously cut through the insulation 38 near the severed ends of the wire 24. While the blades 25 are still embedded in the insulation 38 of the wire 24, the sections of the wire on opposite sides of the severing zone are pulled away from this zone, thereby stripping the tubular insulation 38 from the severed end of the wire, and the plates 27 also function to compress the insulation at the zones of severance thereof and insure more effective stripping as the wire is pulled out of the severed tubular sections. The slides 20, 21 will thereafter be separated, as depicted in Fig. 17, to release the removed sections 38' of insulation 38, and if the removed insulation does not drop out of place by gravity, the knockout plates 35 will subsequently become effective to dislodge the remaining pieces of insulation and will positively cause them to be discharged. After the slides 20, 21 have been separated, the severed section of the wire 24 to the right of the cutting zone will be delivered from the machine, and a new length of wire will be fed across the unobstructed cutting and stripping zone by the wire feeding and stripping motion producing clamps. In this manner, successive sections of the wire 24 are automatically severed from the continuous wire supply and are stripped at their opposite ends, being subsequently delivered from the machine.

From the foregoing detailed description it should be apparent that my present invention provides an improved insulated wire cutting and stripping apparatus which besides being simple and durable in construction, is extremely flexible in its adaptations and highly efficient in normal use. The provision of relatively small carbide insert blades 25, makes it possible to readily remove these stripper blades, or to replace them by blades having different operating characteristics, at relatively small expense, and the provision of the improved clamping plates 27 provides simple means for locking the blades 25 to their carrier elements 26, while at the same time providing simple means for clamping the wire insulation 38 on opposite sides of the severing zone and also providing the recesses 36 for guiding the knockout plates 35. The improved assemblage also makes it possible to utilize straight and effective knockout plates 35 which are adapted to quickly release sticky insulation which adheres to the plates 27 and blades 22, 23, 25; and the improved wire guides 28 are adapted to most effectively position the wire 24 for proper cooperation of the blades 22, 23, 25 therewith. By making all of the various similar elements interchangeable, the cost of construction of the apparatus is obviously reduced to a minimum, and the assembling operation is greatly facilitated, without interfering with the efficiency of operation of the mechanism, and the various parts of the improved assemblage may obviously be manufactured at minimum cost because of the relative simplicity thereof. With the improved structure, the successive sections of the wire 24 are most effectively held and the insulation is thoroughly clamped and compressed near the cutting and stripping knives, thereby insuring clean severance of the wire and removal of the insulation from the severed ends thereof, and the extent of stripping of the insulation from these ends may obviously be quickly and effectively varied so as to produce any desired result. It is also to be noted that it is not necessary to strip the insulation from both of the severed ends of each section of wire 24, since in some instances it is desirable to strip only one end, in which cases one of the stripping blades may be omitted. While specific terms have been employed in order to clearly designate and define the various parts, it is intended that all of these terms be given the broadest possible meaning and interpretation consistent with the prior art, and that no unnecessary limitations be injected into the claims due to the use of these specific clarifying terms It should also be understood that it is not desired to limit this invention to the exact details of construction or to the precise mode of operation, herein shown and described, for various modifications within the scope of the appended claims may occur to persons skilled in the art.

I claim:

1. A wire cutting and stripping assemblage comprising, a pair of spaced supports, a pair of slides movable toward and away from each other between said supports, cooperating wire severing knives carried by said slides, a pair of cooperating insulation cutting and stripping blades disposed laterally of the zone of action of said knives, a carrier element supporting each of said blades and being secured to the adjacent slide and having a rectilinear recess extending therealong, and a stationary knockout plate carried by each of said supports and projecting into the adjacent carrier element recess, said knockout plates being of a length relative to said slides sufficient to project beyond the inner portions of the slides when the latter are moved away from the zone of cutting of said knives.

2. A wire cutting and stripping assemblage comprising, a pair of spaced supports, a pair of slides movable toward and away from each other between said supports, cooperating wire severing knives carried by said slides, a pair of cooperating insulation cutting and stripping blades disposed laterally of the zone of action of said knives, a carrier element supporting each of said blades and being secured to the adjacent slide and having a rectilinear recess extending therealong, a stationary knockout plate carried by each of said supports and projecting into the adjacent carrier element recess, said knockout plates being of a length relative to said slides sufficient to project beyond the inner portions of the slides when the latter are moved away from the zone of cutting of said knives, and an independent wire guide carried by each of said slides adjacent to said blade and said carrier elements.

3. A wire cutting and stripping assemblage comprising, a pair of slides movable toward and away from each other, cooperating wire severing knives carried by said slides, cooperating insulation cutting and stripping blades carried by said slides laterally of the zone of action of said blades, and cooperating insulation clamps carried by said slides between the zones of action of said knives and of said blades.

4. A wire cutting and stripping assemblage comprising, a pair of slides movable toward and away from each other, cooperating wire severing knives carried by said slides, blade carrier members carried by said slides, cooperating insulation cutting and stripping blades carried by said carrier members laterally of the zone of action of said blades, and cooperating insulation clamps carried by said slides between the zones of action of said knives and of said blades.

5. A wire cutting and stripping assemblage comprising, a pair of slides movable toward and away from each other, cooperating wire severing knives carried by said slides, cooperating insulation cutting and stripping blades carried by said slides laterally of the zone of action of said blades, cooperating insulation clamps carried by said slides between the zones of action of said knives and of said blades, and cooperating wire guides carried by said slides between said clamps and the zone of action of said knives.

KARL H. ANDREN.

REFERENCES CITED

The following references are of record in the file of this patent:

UNITED STATES PATENTS

| Number | Name | Date |
|---|---|---|
| 398,229 | Chambers | Feb. 19, 1889 |
| 807,776 | Reisler | Dec. 19, 1905 |
| 921,489 | Webb | May 11, 1909 |
| 1,311,191 | Swayngim | July 29, 1919 |
| 1,464,010 | Miller | Aug. 7, 1923 |
| 1,626,119 | Olin et al. | Apr. 26, 1927 |
| 1,712,506 | Langford | May 14, 1929 |
| 1,733,294 | Cross | Oct. 29, 1929 |
| 1,753,561 | Emmert | Apr. 8, 1930 |
| 1,787,658 | Andren et al. | Jan. 6, 1931 |
| 2,285,167 | Montgomery | June 2, 1942 |